US010122763B2

(12) United States Patent
Lawson et al.

(10) Patent No.: US 10,122,763 B2
(45) Date of Patent: *Nov. 6, 2018

(54) SYSTEM AND METHOD FOR CONNECTING A COMMUNICATION TO A CLIENT

(71) Applicant: Twilio, Inc., San Francisco, CA (US)

(72) Inventors: Jeffrey Gordon Lawson, San Francisco, CA (US); John Robert Wolthuis, San Francisco, CA (US); Evan Mansfield Cooke, San Francisco, CA (US); Jonas Mikael Boerjesson, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/184,621

(22) Filed: Jun. 16, 2016

(65) Prior Publication Data

US 2016/0323320 A1    Nov. 3, 2016

Related U.S. Application Data

(62) Division of application No. 13/478,495, filed on May 23, 2012, now Pat. No. 9,398,622.

(Continued)

(51) Int. Cl.
*H04L 29/06* (2006.01)
*H04W 76/10* (2018.01)
(Continued)

(52) U.S. Cl.
CPC .............. *H04L 63/20* (2013.01); *H04L 63/08* (2013.01); *H04L 63/0807* (2013.01);
(Continued)

(58) Field of Classification Search
CPC ..... H04L 63/08; H04L 63/20; H04L 63/0807; H04W 76/02
(Continued)

(56) References Cited

U.S. PATENT DOCUMENTS 5,274,700 A    12/1993 Gechter et al.
5,526,416 A     6/1996 Dezonno et al.
(Continued)

FOREIGN PATENT DOCUMENTS

DE    1684587 A    3/1971
EP    0282126 A    9/1988
(Continued)

OTHER PUBLICATIONS

"Token-Based Cloud Computing"—Sadeghi et al, Horst Gortz Institute for IT-Security, Ruhr-University May 26, 2010 http://syssec.rub.de/media/trust/veroeffentlichungen/2010/05/26/SSW10.pdf.*

(Continued)

*Primary Examiner* — Randy A Scott
(74) *Attorney, Agent, or Firm* — Schwegman Lundberg & Woessner, P.A.

(57) ABSTRACT

A method and system for connecting a communication to a client including at a system bridge, establishing a client subscription connection with a client device; receiving an incoming communication request at the system bridge; publishing an incoming communication notification from the system bridge to the client device; receiving a client communication at the system bridge; and merging the incoming communication request into the client communication at the system bridge.

15 Claims, 13 Drawing Sheets

Related U.S. Application Data

(60) Provisional application No. 61/489,189, filed on May 23, 2011, provisional application No. 61/500,549, filed on Jun. 23, 2011.

(51) Int. Cl.
  *H04L 29/12* (2006.01)
  *H04M 3/42* (2006.01)

(52) U.S. Cl.
  CPC .......... *H04W 76/10* (2018.02); *H04L 61/303* (2013.01); *H04M 3/42195* (2013.01)

(58) Field of Classification Search
  USPC ........ 713/167, 172, 185, 190; 726/1, 4, 6, 8, 726/10
  See application file for complete search history.

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,252 B1 | 7/2001 | Hutchings et al. |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kailas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |

(56) References Cited

U.S. PATENT DOCUMENTS

| | | | |
|---|---|---|---|
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B2 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soederstroem et al. |
| 8,082,576 B2 * | 12/2011 | Flynn .................... H04L 67/28 726/3 |
| 8,103,725 B2 | 1/2012 | Gupta et al. |
| 8,126,128 B1 | 2/2012 | Hicks, III et al. |
| 8,126,129 B1 | 2/2012 | McGuire |
| 8,130,750 B2 | 3/2012 | Hester |
| 8,130,917 B2 | 3/2012 | Helbling et al. |
| 8,139,730 B2 | 3/2012 | Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | McKeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |

(56) References Cited

U.S. PATENT DOCUMENTS

| | | |
|---|---|---|
| 8,806,024 B1 | 8/2014 | Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,648,006 B2 | 5/2017 | Lawson et al. |
| 2001/0038624 A1 | 11/2001 | Greenberg et al. |
| 2001/0043684 A1 | 11/2001 | Guedalia et al. |
| 2001/0047406 A1 | 11/2001 | Araujo et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-Nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Martino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |

(56) References Cited

U.S. PATENT DOCUMENTS

| | | |
|---|---|---|
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0259307 A1 | 11/2006 | Sanders et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0124536 A1* | 5/2007 | Carper ............... G06F 12/1466 711/115 |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0250635 A1 | 10/2007 | Hamilton et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahem et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Pumadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Cause et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0094674 A1 | 4/2009 | Swartz |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1 | 11/2009 | Nickolov et al. |
| 2009/0288012 A1 | 11/2009 | Udo et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1* | 4/2010 | Glasser ............... G06F 21/6245 726/3 |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |

(56) References Cited

U.S. PATENT DOCUMENTS

| | | |
|---|---|---|
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Udo et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Home et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0019297 A1 | 1/2013 | Lawson et al. |
| 2013/0029629 A1 | 1/2013 | Lindholm et al. |
| 2013/0031158 A1 | 1/2013 | Salsburg |
| 2013/0031613 A1 | 1/2013 | Shanabrook |
| 2013/0036476 A1 | 2/2013 | Roever et al. |
| 2013/0047232 A1 | 2/2013 | Tuchman et al. |
| 2013/0054517 A1 | 2/2013 | Beechuk |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0044123 A1 | 2/2014 | Lawson et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |

(56) References Cited

U.S. PATENT DOCUMENTS

| | | |
|---|---|---|
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, III et al. |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2017/0142166 A1 | 5/2017 | Lawson et al. |
| 2017/0339283 A1 | 11/2017 | Chaudhary et al. |

FOREIGN PATENT DOCUMENTS

| | | | |
|---|---|---|---|
| EP | 1464418 A | | 10/2004 |
| EP | 1522922 A2 | | 4/2005 |
| EP | 1770586 A1 | | 4/2007 |
| EP | 2053869 A1 | | 4/2009 |
| ES | 2134107 A | | 9/1999 |
| JP | 10294788 | | 4/1998 |
| JP | 2004166000 A | | 6/2004 |
| JP | 2004220118 A | | 8/2004 |
| JP | 2006319914 A | | 11/2006 |
| WO | 9732448 A | | 9/1997 |
| WO | 2002087804 | | 11/2002 |
| WO | 2006037492 A | | 4/2006 |
| WO | 018489 | | 2/2009 |
| WO | 2009018489 A | | 2/2009 |
| WO | 2009124223 A | | 10/2009 |
| WO | 2010037064 | | 4/2010 |
| WO | 2010037064 A | | 4/2010 |
| WO | 2010040010 A | | 4/2010 |
| WO | 2010101935 A | | 9/2010 |
| WO | 2011091085 A | | 7/2011 |

OTHER PUBLICATIONS

"Ethernet to Token ring Bridge"—Black Box Corporation, Oct. 1999 http://blackboxcanada.com/resource/files/productdetails/17044.pdf.

Abu-Lebdeh et al. "A 3GPP Evolved Packet Core-Based Architecture for QoS-Enabled Mobile Video Surveillance Applications". 2012 Third International Conference on the Network of the Future (NOF). Nov. 21-23, 2012. pp. 1-6.

Archive Microsoft Office 365 Email | Retain Unified Archiving, 2015, GWAVA, Inc., Montreal, Canada. <http://www.gwava.com/Retain/Retain_for_Office_365.php>.

Complaint for Patent Infringement, *Telinit Technologies, LLC* v. *Twilio Inc.*, dated Oct. 12, 2012.

Kim et al. "In- service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE pp. 7060-7065. 2012.

NPL, "API Monetization Platform", 2013.

RFC 3986: Uniform Resource Identifier (URI): Generic Syntax; T. Berners-Lee, R. Fielding, L. Masinter; Jan. 2005; The Internet Society.

S. barakovic and L. Skorin-Kapov. "Survey and Challenges of QoE Management Issues in Wireless Networks". 2012, pp. 1-29.

Subramanya, et al. "Digital Signatures", IEEE Potentials, Mar./Apr. 2006, pp. 5-8.

Tran et al. "User to User adaptive routing based on QoE" ICNS 2011: The Seventh International Conference on Networking and Services. pp. 170-177. 2011.

Twilio Cloud Communications—APIs for Voice, VoIP, and Text Messaging, Twilio. <http://www.twilio.com/docs/api/rest/call-feedback>.

Wu et al. "Quality Evaluation in Peer-to-Peer IPTV Services" Data Traffic and Monitoring Analysis, LNCS 7754. pp. 302-319. 2013.

"U.S. Appl. No. 15/404,751, Notice of Allowance dated May 17, 2018", 9 pgs.

"U.S. Appl. No. 13/478,495, Non Final Office Action dated Dec. 9, 2015", 10 pgs.

"U.S. Appl. No. 13/478,495, Notice of Allowance dated Apr. 6, 2016", 9 pgs.

"U.S. Appl. No. 13/478,495, Response filed Feb. 29, 2016 to Non Final Office Action dated Dec. 9, 2015", 6 pgs.

"U.S. Appl. No. 13/478,495, Response filed Jun. 12, 2015 to Restriction Requirement dated May 20, 2015", 7 pgs.

"U.S. Appl. No. 13/478,495, Restriction Requirement dated May 20, 2015", 7 pgs.

"U.S. Appl. No. 13/624,739, Examiner Interview Summary dated Sep. 21, 2015", 3 pgs.

"U.S. Appl. No. 13/624,739, Examiner Interview Summary dated Oct. 19, 2016", 3 pgs.

"U.S. Appl. No. 13/624,739, Examiner Interview Summary dated Dec. 29, 2014", 3 pgs.

"U.S. Appl. No. 13/624,739, Final Office Action dated Jul. 14, 2015", 32 pgs.

"U.S. Appl. No. 13/624,739, Non Final Office Action dated Jul. 12, 2016", 36 pgs.

"U.S. Appl. No. 13/624,739, Non Final Office Action dated Aug. 27, 2014", 16 pgs.

"U.S. Appl. No. 13/624,739, Notice of Allowance dated Feb. 3, 2017", 17 pgs.

"U.S. Appl. No. 13/624,739, Response filed Feb. 20, 2015 to Non Final Office Action dated Aug. 27, 2014", 18 pgs.

"U.S. Appl. No. 13/624,739, Response filed Oct. 11, 2016 to Non Final Office Action dated Jul. 12, 2016", 6 pgs.

"U.S. Appl. No. 13/624,739, Response filed Nov. 13, 2015 to Final Office Action dated Jul. 14, 2015", 19 pgs.

"U.S. Appl. No. 14/054,254, Examiner Interview Summary dated Apr. 4, 2016", 3 pgs.

"U.S. Appl. No. 14/054,254, Final Office Action dated Aug. 15, 2016", 11 pgs.

"U.S. Appl. No. 14/054,254, Non Final Office Action dated Dec. 31, 2015", 26 pgs.

"U.S. Appl. No. 14/054,254, Response filed Mar. 31, 2016 to Non Final Office Action dated Dec. 31, 2015", 20 pgs.

"U.S. Appl. No. 15/404,751, Non Final Office Action dated Dec. 29, 2017", 7 pgs.

"U.S. Appl. No. 15/404,751, Response filed Mar. 23, 2018 to Non Final Office Action dated Dec. 29, 2017", 5 pgs.

\* cited by examiner

SYSTEM AND METHOD FOR CONNECTING A COMMUNICATION TO A CLIENT

CLAIM OF PRIORITY

The present application is a divisional of U.S. patent application Ser. No. 13/478,495, filed 23 May 2012, which claims priority to: U.S. Provisional Patent Application Ser. No. 61/489,189 entitled "System and Method for Connecting a Call to a Client" and filed on 23 May 2011; and U.S. Provisional Patent Application Ser. No. 61/500,549 entitled "System and Method for Connecting a Call to a Client" and filed on 23 Jun. 2011, the entirety of both of which is incorporated by this reference.

TECHNICAL FIELD

This invention relates generally to the telephony field, and more specifically to a new and useful system and method for connecting a call to a client in the telephony field.

BACKGROUND

In recent years, telephony applications and Voice over Internet Protocol (VoIP) have found applications in numerous settings. Such technology has enabled clients to establish communication to outside devices such as phones or applications. However, the nature of most network configurations prevents easy incoming messages. Clients behind network address translation (NAT) routers have long been hindered by a lack of end-to-end connectivity that makes incoming communications challenging. Varying network, router, and firewall configurations can complicate this issue. These structural inadequacies seriously limit the scope and applicability of Internet-based telephony. Thus, there is a need in the telephony field to create a new and useful system and method for connecting a call to a client. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Methods

Figure 1:
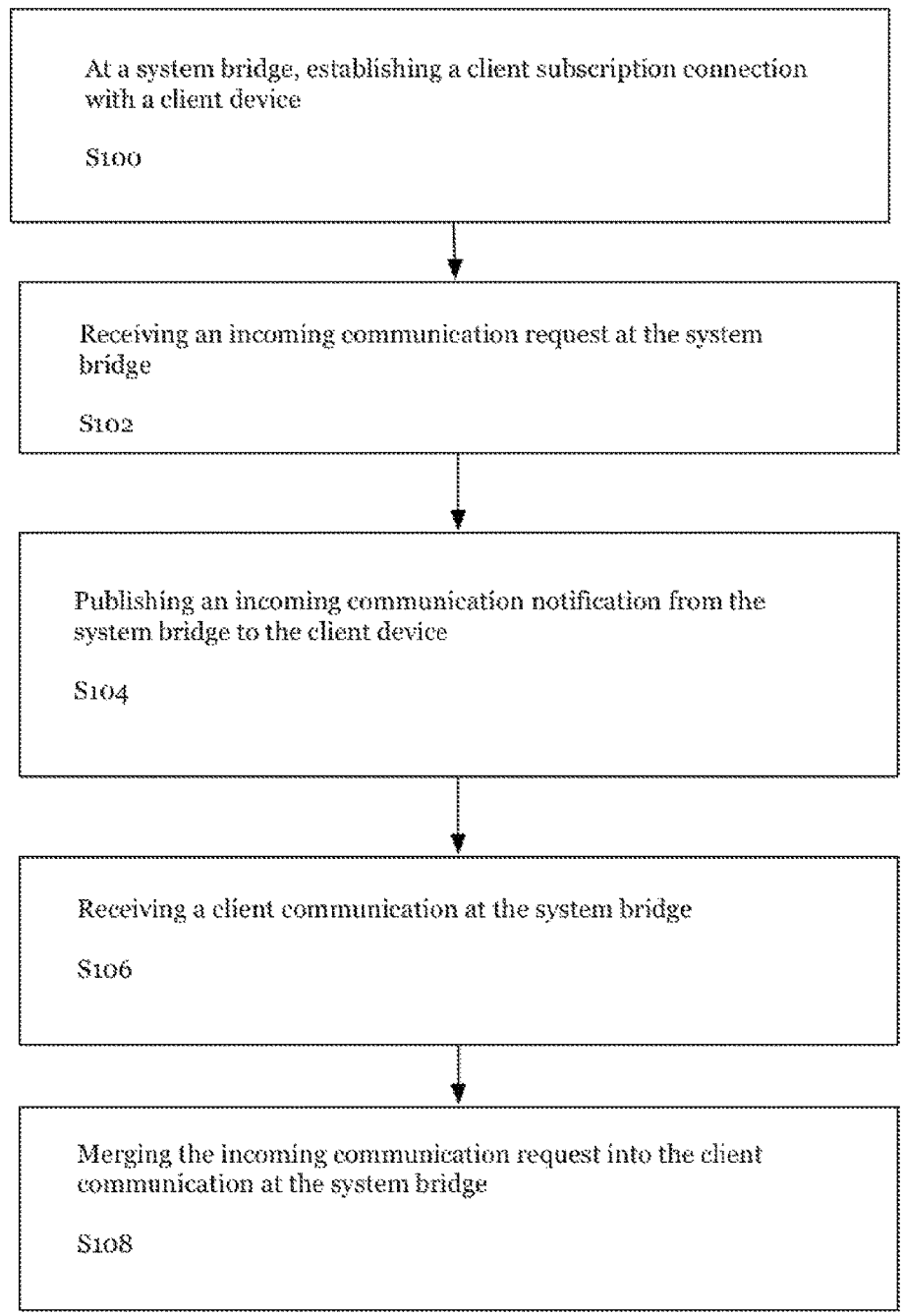
FIG. 1 is a flowchart depicting a first method for connecting a communication to a client in accordance with a preferred embodiment.
Figure 2:
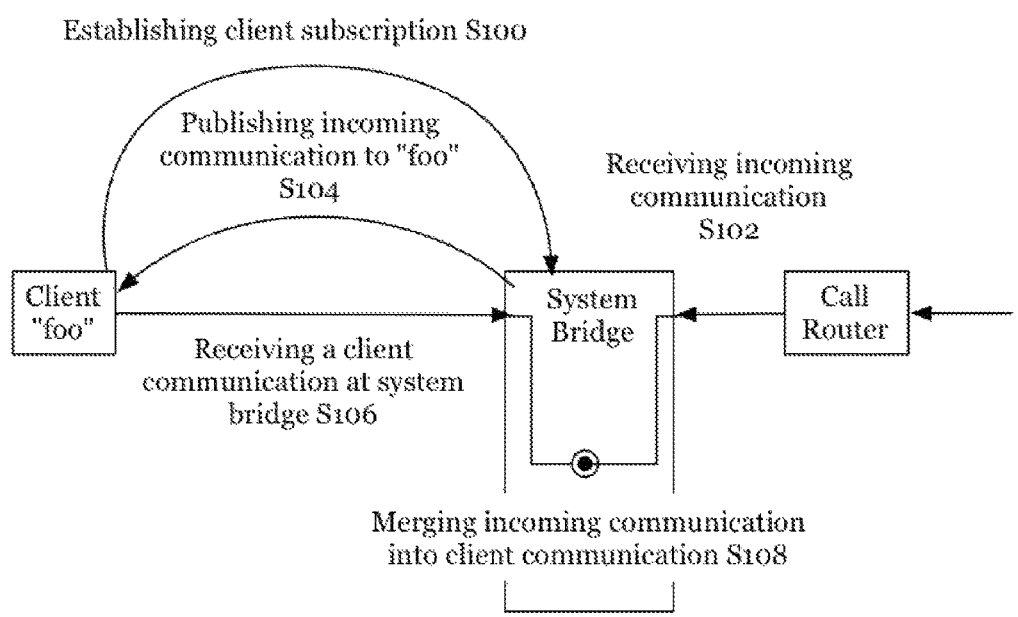
FIG. 2 is schematic representations of preferred method for connecting a communication to a client in accordance with a preferred embodiment.

As shown in FIGS. 1 and 2, a first preferred method for connecting a communication to a client of a preferred embodiment can include: at a system bridge, establishing a client subscription connection with a client device in block S100; receiving an incoming communication request at the system bridge in block S102; publishing an incoming communication notification from the system bridge to the client device in block S104; receiving a client communication at the system bridge in block S106; and merging the incoming communication request into the client communication at the system bridge in block S108. The first method preferably functions to connect incoming communications to a client utilizing a subscription connection that prompts a client to call out. The first method preferably creates a substantially persistent channel of communication such that a client can actively establish a connection when an incoming message arrives, which in turn preferably enables web services, mobile devices, and platforms that want to implement features for incoming communications to circumvent incoming communication issues caused by firewalls and routers. In one alternative implementation of the first preferred method, client communication is preferably initiated by a client as opposed to a client directly responding to a received incoming call.

Preferably, the first preferred method can employ authentication and/or authorization security measures that function to secure the communication channels. An authentication layer preferably prevents malicious parties from posing as a client and/or incoming call. In one embodiment, an application (web or native) may facilitate the use of a token to authenticate a client connecting to an incoming call. The first preferred method is preferably used within internet-telephony platform, but may alternatively be used for any suitable applications such as Internet messaging or real-time applications that may need to establish an incoming communication channel. The method can be configured and/or adapted to function for any suitable type of communication, including telephony-based voice calls, Internet based voice calls, video calls, video streams, video sessions, screen sharing, screen sharing streams, screen sharing sessions, SMS messaging, IP messaging, alternative messaging, or any suitable form of communication. The term call should be understood to include any suitable application, and any suitable form of incoming communication to a client may be received and merged with the client through this method, such as video, screen sharing, chat, or text messaging.

As shown in FIG. 1, the preferred method can include block S100, which recites at the system bridge, establishing a client subscription connection with a client device. Block S100 preferably functions to create a substantially persistent connection between the client and the system bridge. The client subscription connection is preferably a publication/subscription Internet communication channel that can be used to push incoming call notifications to the client. The subscription channel can include one or more websockets, an HTTP server push, an Adobe flash socket, ajax long polling, ajax multipart streaming, a forever iframe, jsonp polling, Comet, XMPP, BOSH, or any suitable communication technology to facilitate a client subscription. The subscription connection is preferably persistently maintained. The client preferably establishes a client subscription connection by initially registering a subscription channel and then subscribing to that channel. The channel is preferably subscribed to using a method substantially similar to method for connecting a client to an application described below where the use of a token is used. Alternatively, any suitable technique to subscribe may be used. Once registered, the system bridge will preferably publish a notification to that subscription. The subscription connection is preferably established between a client and a system bridge through a pubsub system, but any suitable subscription connection may be used. A client identifier is preferably created which may be used for the subscription channel but additionally as a handle or mapping for addressing incoming calls. The client identifier is preferably specified by the client, but may alternatively be an automatically assigned client identifier. The client identifier preferably includes a client ID, which may be signed with a shared secret. The client identifier may include various scopes that may take form as subdirectories or hierarchical layers of contexts. For example, one name space of "foo" may have a subdirectory of "foo/mobile" and a second subdirectory of "foo/web". In this example, "foo/mobile" may be registered for a mobile device client and "foo/web" may be registered for a desktop browser session. Incoming calls can preferably address these devices individually by using "foo/mobile" or "foo/web". Additionally, an incoming call may be simultaneously directed at both clients by using "foo/*". Additional attributes can be assigned to the name-spaced endpoint or to different scopes of the name-spaced endpoint. Additionally the client identifiers may be used to broadcast to multiple clients. Clients can preferably subscribe to client identifiers. For example a plurality of clients may subscribe to "foo" and each receive a request sent to "foo".

Block S102, which recites receiving an incoming communication request at the system bridge, functions to accept a communication from an outside entity directed to a client. The incoming call may have any suitable source. A cloud-based communication router preferably initially receives/initiates the incoming communication. The cloud-based communication router is preferably a call router call router of a telephony platform such as one substantially similar to the one described in published U.S. Patent Application No. 2009/0252159, titled "SYSTEM AND METHOD FOR PROCESSING TELEPHONY SESSIONS", which is hereby incorporated in its entirety by this reference, but the cloud-based communication router may alternatively be any suitable communication router. Alternatively, the system bridge may be integrated into the cloud-based router or call router architecture or alternatively into any suitable communication framework. The incoming call preferably specifies an identifier, and more preferably, the incoming call specifies a name-spaced client identifier. The identifier preferably corresponds to a client or more preferably a subscription channel. In one variation, the client may vary depending on what user devices are active, and thus the identifier is preferably not specific to a particular client device (e.g., addressing to "foo/*"). The identifier is preferably unique to a user, account, session, or any suitable entity. Preferably using the identifier, a subscription is identified and an incoming communication notification is generated for publishing in block S104. While the client is notified and calls out, the system bridge preferably puts the incoming communication into a holding-state. The holding state is preferably a temporary state where the incoming communication is received by the system bridge but the client (e.g., the callee) has not initiated an outgoing communication to connect to the caller. When the system bridge is ready to merge the incoming communication to a client, the incoming communication is pulled from the holding-state.

Figure 3:
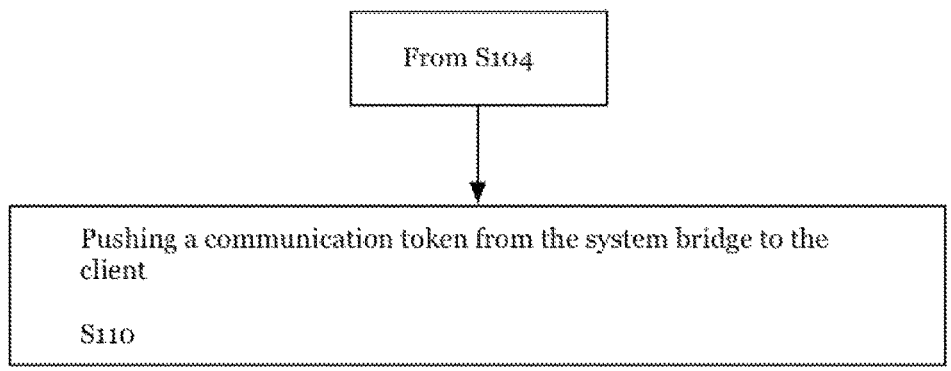
FIG. 3 is a flowchart depicting a variation of the first preferred method for connecting a communication to a client.
Figure 4:
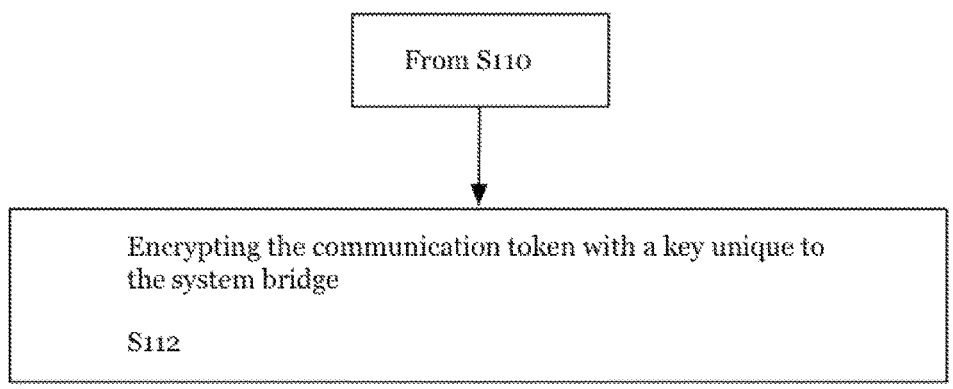
FIG. 4 is a flowchart depicting another variation of the first preferred method for connecting a communication to a client.
Figure 5:
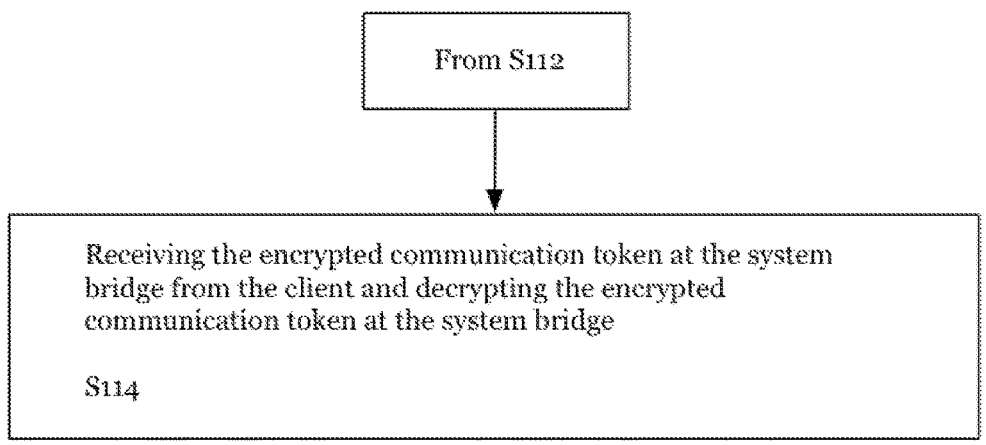
FIG. 5 is a flowchart depicting another variation of the first preferred method for connecting a communication to a client.
Figure 15:
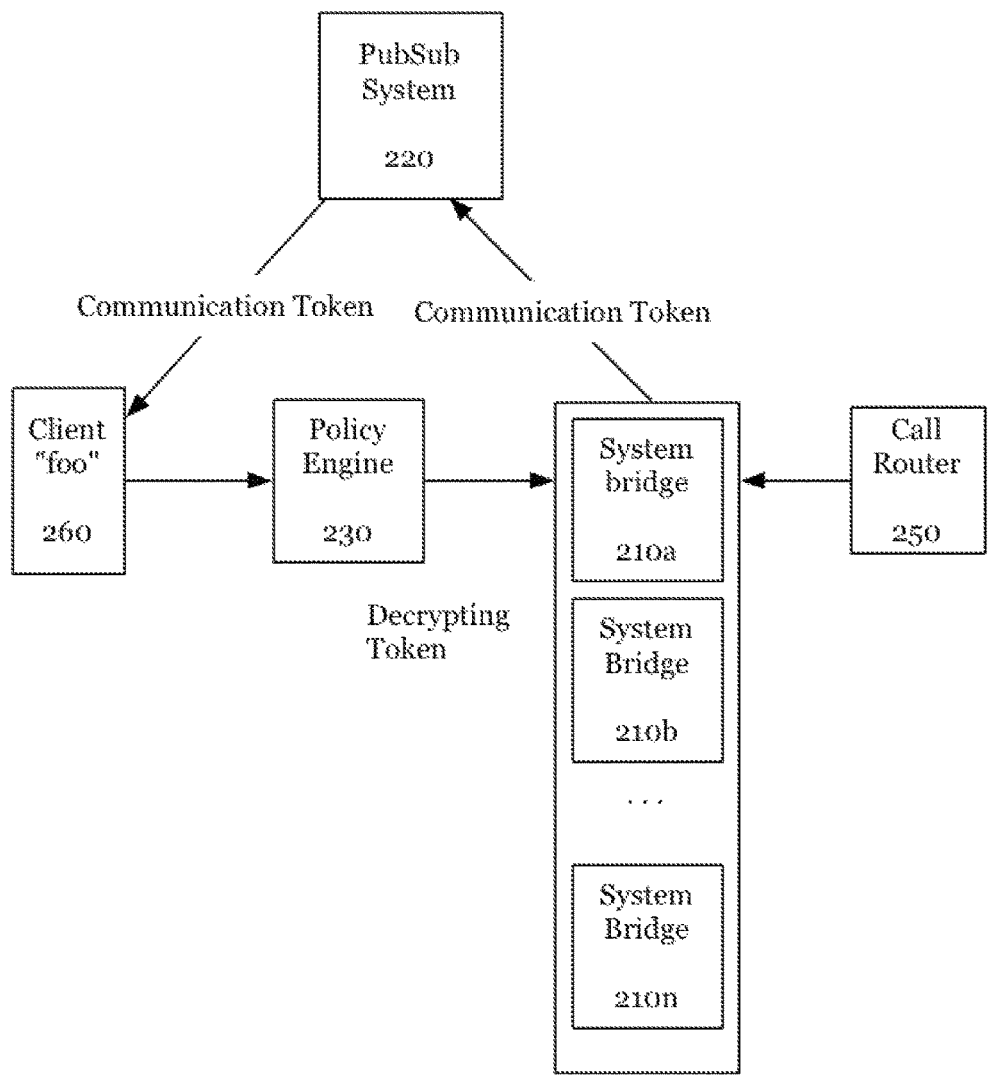
FIG. 15 is a schematic block diagram of another system for connecting a communication to a client in accordance with a preferred embodiment.

Block S104, which recites publishing an incoming communication notification from the system bridge to the client device, functions to push a message to the client through the subscription channel. The client subscription channel preferably facilitates simple notification because the connection is substantially persistent and the outside entity is not required to independently establish the connection. There may additionally be a plurality of clients subscribed to the subscription channel, and the incoming communication notification may be published a plurality of clients. The incoming communication notification is preferably sufficient to initiate a client communication sent to the system bridge by the client. Alternatively, the communication notification may include additional parameters such as keys to authenticate the message is from the system bridge, call URI's to direct a call out, caller metadata, and/or any suitable parameter. The system bridge may additionally pass opaque data (from the perspective of the client) to the client. This data is preferably passed along when the client connects back in. In one variation, block S104 may include pushing a communication token from the system bridge to the client S110 as shown in FIG. 3. The passed communication token may be used to later identify which incoming communication to connect with the client communication. The communication token preferably includes a communication ID and a host (identifier for the instance) that allows the incoming communication to be uniquely identified across multiple bridge nodes. Block S110 preferably includes encrypting the communication token with a key unique to the system bridge in block S112 and as shown in FIG. 4. The variation preferably includes receiving the encrypted communication token at the system bridge from the client and decrypting the encrypted communication token at the system bridge in Block S114 as shown in FIG. 5. The passing of a communication token functions to remove the need for an external state, unnecessary because the state is preferably contained in the system bridge token. As described below, the communication token is preferably passed back to the system bridge from the client, and the communication token is then decrypted with the bridge system secret and the call (or connection) bridged as shown in FIG. 15. When there is a plurality of system bridges used in a scale infrastructure, the token preferably indicates which system bridge to pass the client communication message. If the subscription channel is encrypted and authorized, then the token may additionally function to provide security for incoming connections.

Block S106, which recites receiving a client communication at the system bridge, functions to have the client call out to the system bridge to be merged with the incoming communication. The client, upon receiving the communication notification from block S104, preferably initiates forming connections to the system bridge. The client may be any suitable device with a network connection to the system bridge. The client device may be running a native application or alternatively a web application. The call out message is preferably communicated through HTTP or HTTPS but any suitable transport layer may alternatively be used. Any additional parameters from the client are preferably included in a message to the system bridge as appropriate, such as an application identifier or application data. The application identifier is preferably a name-spaced endpoint. A name spaced endpoint is preferably a context that embodies various aspects for the endpoint (e.g., a client). Name-spaced endpoints preferably include a plurality of parameters including associated phone numbers, application URI's, status callback URI's (e.g., backup URI's if communication with a client application fails), or any suitable parameter. A name-spaced endpoint may be globally or locally unique for a given user. For example, a name-spaced endpoint may be unique for all communication occurring over a platform or protocol. The name-spaced endpoint may alternatively, be unique for an instance of an application. Allowed users, pricing models, account-application settings, and/or any suitable aspects can be stored as part of the name-spaced endpoint. For example, only particular users may be allowed to call in or use a particular scope of a name-spaced endpoint while a second scope may be publicly accessible.

Figure 6:
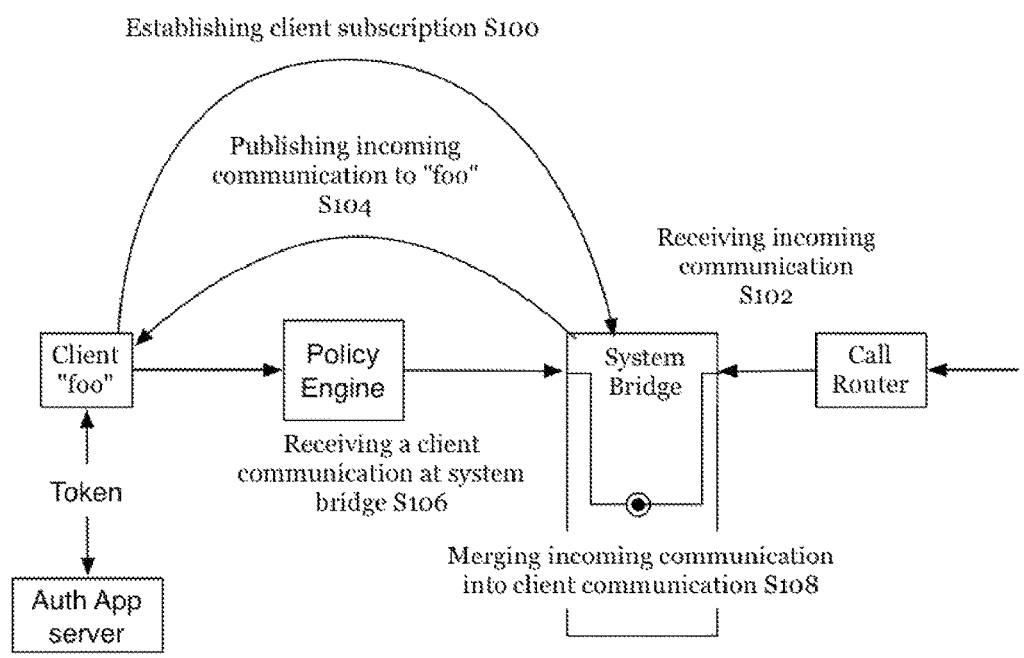
FIG. 6 is schematic representations of preferred methods for connecting a communication to a client in accordance with a preferred embodiment.
Figure 7:
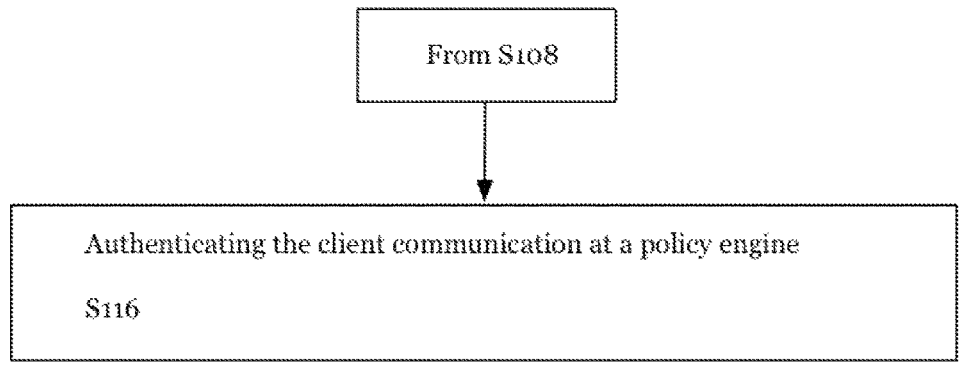
FIG. 7 is a flowchart depicting another variation of the first preferred method for connecting a communication to a client.
Figure 8:
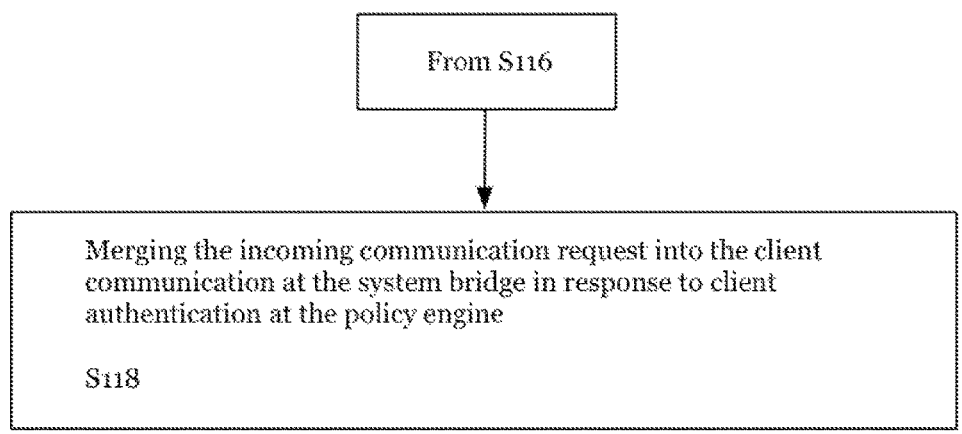
FIG. 8 is a flowchart depicting another variation of the first preferred method for connecting a communication to a client.

Additionally or alternatively, security measures are taken to authenticate the message from the client to the system bridge as shown in FIG. 6. Block S108 preferably includes authenticating the client communication at a policy engine S116 as shown in FIG. 7. The policy engine preferably authenticates a client communication from the client prior to merging the incoming communication. The policy engine preferably authenticated the client by using a token associated with the client and analyzing a signed client communication from the client. If the client communication satisfies the authentication, a preferred embodiment preferably includes merging the incoming communication request into the client communication at the system bridge in response to client authentication at the policy engine S118 as shown in FIG. 8. If the client communication fails to satisfy the authentication, an error may be logged and any suitable error response may be taken. Preferably, the token is sent from the client. In one variation, the client has an embedded token from when an application was instantiated. In another variation, a communication can be made to an authentication application to retrieve a token. Alternatively, a client identifier is sent to a policy engine that has an authentication application authenticate the credentials of the client identifier. Similarly a SIP backend authentication may alternatively be used. The authentication may occur for registration and/or outbound communications. The token preferably includes an application ID and any additional parameters. The contents of a token are preferably signed with a secret key. A policy engine preferably completes authentication of the token before allowing a connection to the system bridge. A policy engine preferably mediates the call out requests and authenticates any tokens, and may additionally verify permissions associated with application identifiers. Any suitable alternative forms of authentication may alternatively or additionally be integrated into the method.

Block S108, which recites merging the incoming communication request into the client communication at the system bridge, functions to connect the incoming communication request to the client. Once the client sends a client communication to the system bridge, the system bridge preferably identifies the corresponding incoming communication and establishes the communication channel between the client and the outside entity of the incoming communication. The incoming communication is preferably moved out of the holding-state and added to an active channel of communication with the intended client. Upon establishing the connection, the client and the outside entity can preferably continue to use the established connection for communication. For example, a VoIP call made to the system bridge may be connected to a client device, and then a VoIP session can preferably continue to use the channel established by the preferred method. The connection may be any suitable form of connection including a number of channels that may include audio, video, messaging, screen sharing, or any suitable channel for communication.

Figure 9:
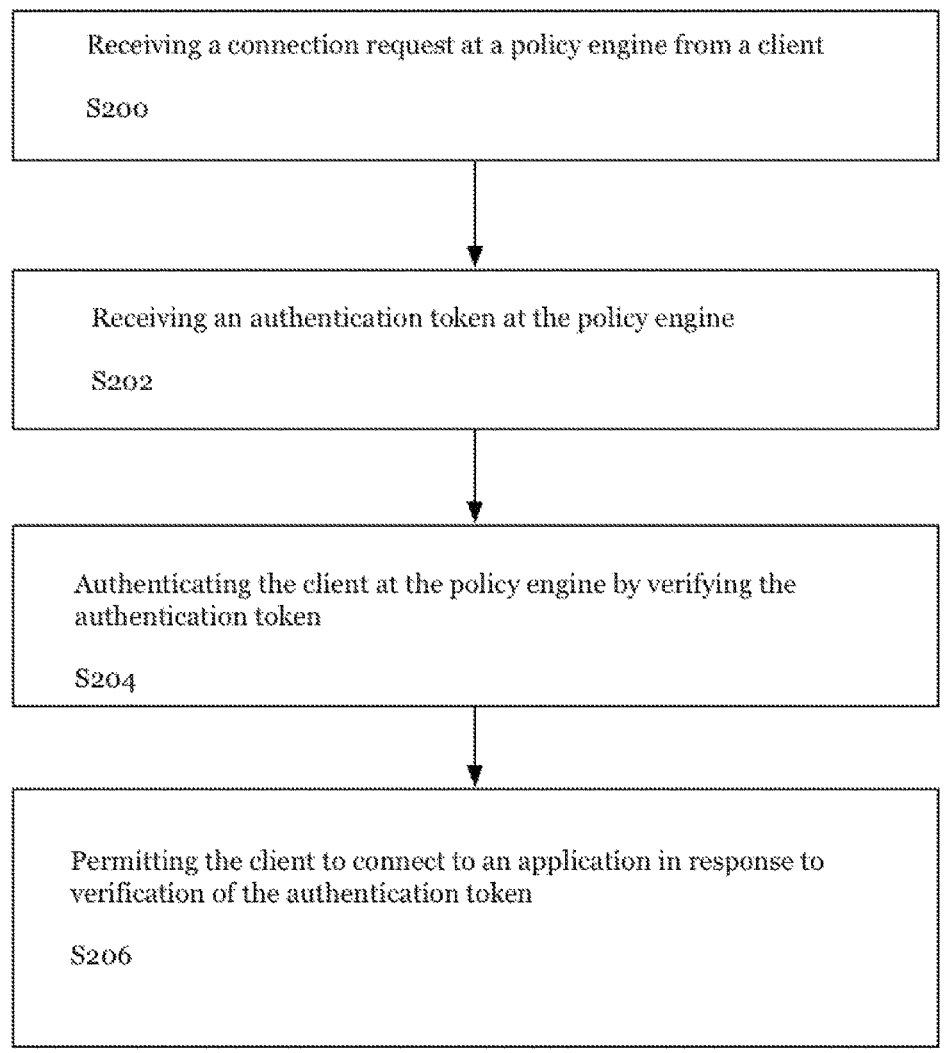
FIG. 9 is a flowchart depicting a second method for connecting a communication to a client in accordance with a preferred embodiment.

As shown in FIG. 9, a second preferred method for connecting a client to an application of a preferred embodiment includes receiving a connection request at a policy engine from a client, the connection request including an authentication token retrieved by the client in block S200; receiving an authentication token at the policy engine S202; authenticating the client at the policy engine by verifying the authentication token in block S204; and permitting the client to connect to an application in response to verification of the authentication token in block S206. The method functions to enable a possibly untrusted client to securely access application services and resources. A client preferably describes a web browser, application session, or any suitable outside entity. The method is preferably implemented for use with a telephony platform but may alternatively be used for any suitable communication platform. The method may be used to implement browser based telephony application such as click to call features, voice sessions, video calls, video streams, screen sharing, sending of SMS messages, alternative messaging, or any suitable application. In an exemplary application, the client is enabled to initiate and interact with a telephony application by obtaining a token to authenticate access to the application. Additionally, the method of connecting a client to an application may be applied in cooperation with the method above for a client receiving incoming communications.

Figure 10:
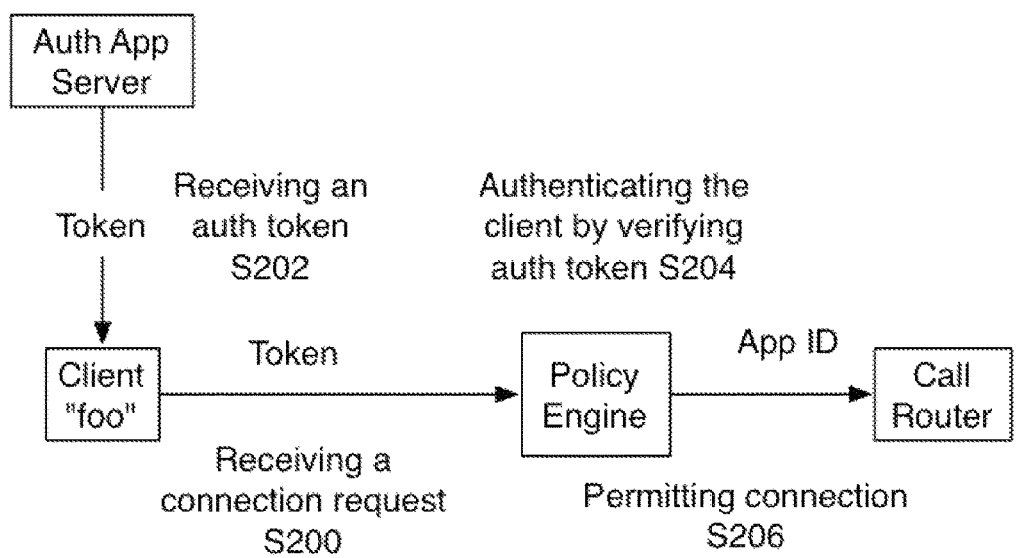
FIG. 10 is a schematic representation depicting a variation of the second preferred method for connecting a communication a communication to a client.
Figure 11:
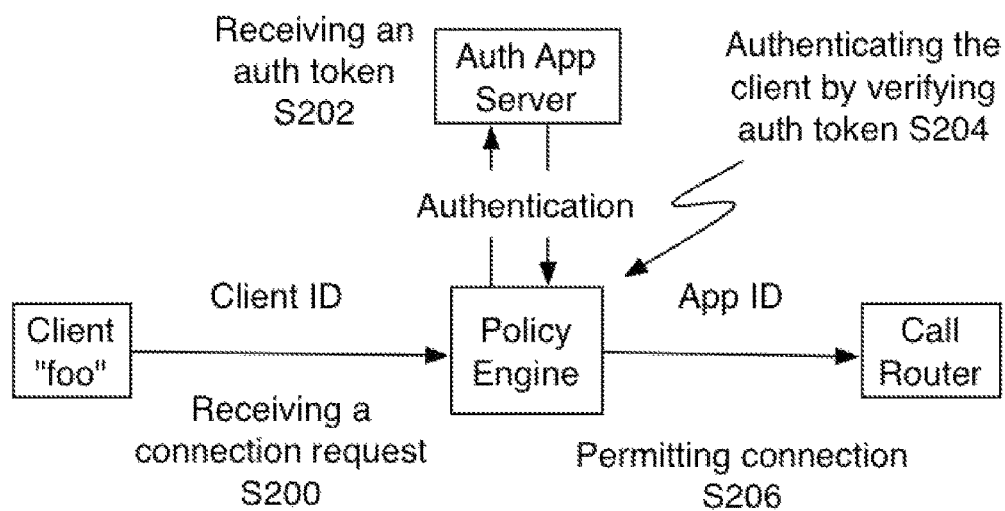
FIG. 11 is a schematic representation depicting another variation of the second preferred method for connecting a communication a communication to a client.

Block S200, which recites receiving a connection request at a policy engine from a client, functions to receive communication from a client wishing to use an application. As described below, an authentication token is preferably directly or indirectly communicated to the policy engine. The policy engine then can preferably allow or deny access to an application by a client based on the verification of the authentication token. The connection request may be accompanied by the token as shown in FIG. 10 or the connection request may come prior to obtaining a token as shown in FIG. 11.

Figure 12:
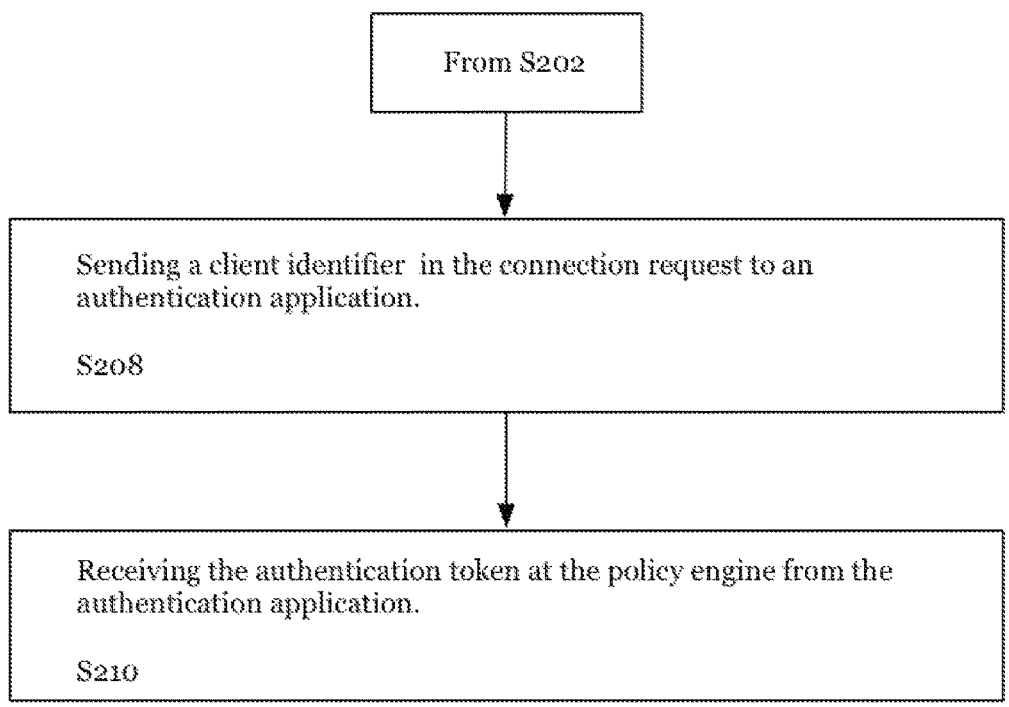
FIG. 12 is a is a flowchart depicting a variation of the second preferred method for connecting a communication to a client.

Block S202, which recites receiving an authentication token at the policy engine, functions to obtain an authentication token on behalf of a client. The authentication token is preferably a data package that includes application ID and/or additionally parameters. The authentication token is preferably signed. The authentication token is more preferably signed with a secret key shared by the policy engine and an accessing entity (e.g., a web application for use of the telephony application). The application ID and/or the authentication token may be sent to client, which may then use the authentication token to connect to a web application. In another variation, the client may provide an identifier that enables a policy engine to validate with an authentication application. In the first variation, as shown in FIG. 10, a web application preferably sends an authentication token to the client. The client then communicates the authentication token directly when sending a connection request. The authentication token may be embedded in the webpage or application when instantiated. Alternatively, a client may dynamically request the authentication token such as by using AJAX upon a user-triggered event. In a second variation, as shown in FIG. 11, the client may send an identifier when sending a connection request for indirectly obtaining a token for a client. In this variation, block S202 preferably includes sending a client identifier contained in the connection request from the client to an authentication application S208 and receiving the authentication token at the policy engine from the authentication application S210 as shown in FIG. 12. A policy engine preferably connects with an authentication application. The authentication application can preferably use the identifier to authenticate or deny access by the client. The authentication application then sends a response to the policy engine preferably includes an authentication token. The authentication token received at the policy engine from the authentication application preferably enables the client to be indirectly authorized to form a connection. The authentication application is preferably a server run by the web application entity, but may alternatively be a third party authentication application. The identifier may include an account name, code, or any suitable parameters that the authentication application requires to complete authentication.

Block S204, which recites authenticating the client at the policy engine by verifying the authentication token, functions to determine if a client should be allowed or denied access to an application. In the first variation where a token is received from the client, a shared secret between the application and the policy engine may be used to authenticate the token. In the second variation, the authentication application may send the authentication token, which may be authorized in a similar manner, or the authentication application may communicate to the policy engine if the client is allowed or denied.

Figure 13:
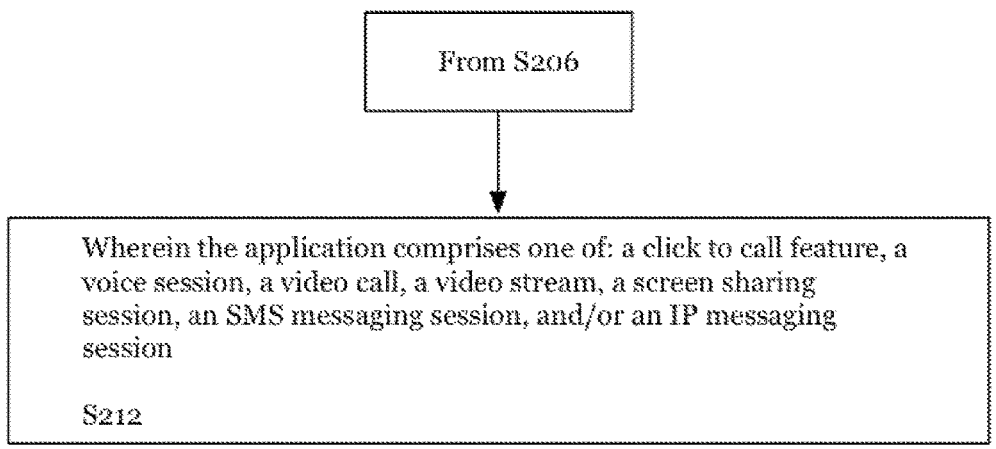
FIG. 13 is a is a flowchart depicting another variation of the second preferred method for connecting a communication to a client.

Block S206, which includes permitting the client to connect to an application in response to verification of the authentication token, functions to allow the client to connect to the application or to deny the client access to the application. The connection request from the client is preferably forwarded on to the application if the verification of the authentication token allows access. If the connection request is denied, a communication may be sent back to the client or any suitable response may be made. The connection in one application is preferably establishing a voice session, video session, click to call feature, starting an outbound call, a video stream, a screen sharing session, SMS/MMS messaging, IP messaging session, and/or any suitable communication application as in block S212 shown in FIG. 13. In one exemplary application, a call router of a telephony platform preferably facilitates execution of the application.

Systems

Figure 14:
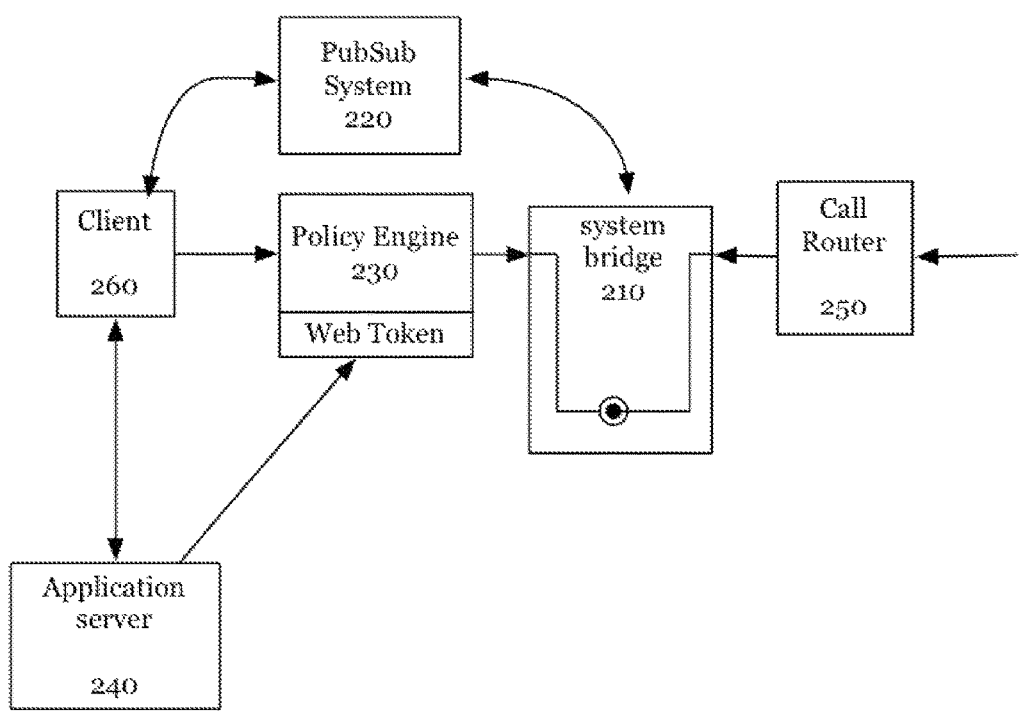
FIG. 14 is a schematic block diagram of a system for connecting a communication to a client in accordance with a preferred embodiment.

As shown in FIG. 14, a system for connecting a call to a client of a preferred embodiment preferably includes a system bridge 210, a pub/sub system 220, and optionally a policy engine 230. The system preferably functions to facilitate connecting an outside entity to a client 260. The system preferably implements the above method. The system bridge 210 preferably includes an incoming channel to receive incoming calls or video such as from a PSTN device, another client device, or any suitable source. In one embodiment, the system bridge 210 includes a communication link to a call router 250 of a telephony platform. In another embodiment, the system bridge 210 is integrated into a call router 250. In another implementation, a SIP endpoint is used in place of a call router. As shown in FIG. 15, the system bridge 210 may be a cloud environment or system bridge cluster composed of a plurality of system bridges (210a, 210b, 210n). The system bridge 210 preferably additionally includes internet channels to be accessed by a client 260. The system bridge 210 preferably connects to the pub/sub system 220, and the pub/sub system 220 preferably maintains persistent connections to clients. The pub/sub system 220 may use any suitable technology such as websockets, HTTP server push, adobe flash sockets, AJAX long polling, AJAX multipart streaming, forever iframes, jsonp polling, Comet, XMPP, BOSH, or any suitable communication technology to facilitate subscription and publication channels. Any suitable system may be used in place of the pub/sub system such as a queuing system. The client 260 preferably includes native or web application code that cooperates with the system to establish a subscription through the pub/sub system 220 to the system bridge 210 and to send a client communication that is received by the system bridge 210. The client preferably uses HTTP or HTTPS or any suitable communication protocol. Additionally, a policy engine 230 may be an intermediary system for the communication channel between clients and the system bridge 210. The policy engine 230 preferably authenticates signed messages using web tokens, but may alternatively be configured for any suitable form of authentication. An authentication application server 240 preferably facilitates the distribution and/or processing of authentication tokens.

The system preferably implements the above methods in a computer-readable medium storing computer-readable instructions. The instructions are preferably executed by computer-executable components preferably integrated with the system bridge 210, the pub/sub system 220, and the optional policy engine 230. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method comprising:
   a policy engine receiving a connection request from a client device, the connection request including a client identifier;
   the policy engine sending the received client identifier to an authentication server;
   the policy engine receiving an authentication token for the client identifier from the authentication server;
   the policy engine authenticating the client device by verifying the authentication token;

responsive to verification of the authentication token by the policy engine, a system bridge establishing a persistent client subscription connection with the client device via a pub-sub system, the persistent client subscription connection being a connection of the pub-sub system;

the system bridge receiving an incoming communication;

the system bridge encrypting a communication token with a key unique to the system bridge and pushing the encrypted communication token to the client device via the persistent client subscription connection of the pub-sub system;

the system bridge receiving the encrypted communication token and a client communication from the client device; and the system bridge merging the received incoming communication with the client communication received from the client device by using the encrypted communication token received from the client device.

2. The method of claim 1, wherein the encrypted communication token identifies the system bridge within a distributed computing cluster comprising at least two system bridges.

3. The method of claim 1, wherein the encrypted communication token comprises a communication identifier and a host identifier.

4. The method of claim 1, wherein the client device is a mobile device.

5. The method of claim 4, wherein a native application running on the mobile device controls the mobile device to send the connection request to the policy engine.

6. The method of claim 5, wherein the encrypted communication token comprises a communication identifier and a host identifier.

7. The method of claim 5, wherein the encrypted communication token identifies the system bridge within a distributed computing cluster comprising at least two system bridges.

8. The method of claim 1, wherein the system bridge receives the encrypted communication token from the client device via the persistent client subscription connection of the pub-sub system.

9. The method of claim 2, wherein the system bridge receives the client communication from the client device via the persistent client subscription connection of the pub-sub system.

10. The method of claim 7, wherein the system bridge receives the encrypted communication token from the client device via the persistent client subscription connection of the pub-sub system.

11. The method of claim 10, wherein the system bridge receives the client communication from the client device via the persistent client subscription connection of the pub-sub system.

12. The method of claim 9, wherein the client communication is communication of a voice communication session.

13. The method of claim 9, wherein the client communication is communication of a video communication session.

14. The method of claim 9, wherein the client communication is communication of a screen sharing session.

15. The method of claim 9, wherein the client communication is communication of an IP messaging session.

* * * * *

UNITED STATES PATENT AND TRADEMARK OFFICE
CERTIFICATE OF CORRECTION

PATENT NO. : 10,122,763 B2
APPLICATION NO. : 15/184621
DATED : November 6, 2018
INVENTOR(S) : Lawson et al.

Page 1 of 1

It is certified that error appears in the above-identified patent and that said Letters Patent is hereby corrected as shown below:

On the Title Page

On page 7, in Column 2, under "Other Publications", Line 36, delete "Jun. 12," and insert --Jun. 2,-- therefor Signed and Sealed this
Seventh Day of April, 2020

Andrei Iancu
*Director of the United States Patent and Trademark Office*